US012791900B2

(12) United States Patent
Chen et al.

(10) Patent No.: US 12,791,900 B2
(45) Date of Patent: Nov. 10, 2026

(54) ELECTRONIC DEVICE AND SHADING DEVICE

(71) Applicant: InnoLux Corporation, Miao-Li County (TW)

(72) Inventors: En-Hsiang Chen, Miao-Li County (TW); Chih-Chin Kuo, Miao-Li County (TW); Mao-Shiang Lin, Miao-Li County (TW); Hsu-Kuan Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 89 days.

(21) Appl. No.: 18/783,887

(22) Filed: Jul. 25, 2024

(65) Prior Publication Data

US 2025/0068013 A1 Feb. 27, 2025

(30) Foreign Application Priority Data

Aug. 23, 2023 (CN) ......................... 202311065792.6

(51) Int. Cl.
*G02F 1/1347* (2006.01)
*G02F 1/1337* (2006.01)

(52) U.S. Cl.
CPC .......... *G02F 1/1347* (2013.01); *G02F 1/1337* (2013.01); *G02F 1/133711* (2013.01); *G02F 1/133749* (2021.01); *G02F 1/133757* (2021.01)

(58) Field of Classification Search
CPC ................. G02F 1/1347; G02F 1/1337; G02F 1/133711; G02F 1/133749; G02F 1/133757
See application file for complete search history.

(56) References Cited

U.S. PATENT DOCUMENTS

2010/0118256 A1* 5/2010 Schadt ................ G02B 27/281 349/194
2012/0169950 A1* 7/2012 Tatzel .............. G02F 1/133528 427/532
2014/0355115 A1* 12/2014 Wu ...................... G02B 5/3083 359/489.07

FOREIGN PATENT DOCUMENTS

TW I536054 A 6/2016

* cited by examiner

*Primary Examiner* — Jia X Pan
(74) *Attorney, Agent, or Firm* — McClure, Qualey & Rodack, LLP

(57) ABSTRACT

An electronic device includes a first dimming device and a second dimming device. The first dimming device includes a first dimming module having a first liquid-crystal layer and a second dimming module having a second liquid-crystal layer. The second dimming device includes a third dimming module having a third liquid-crystal layer and a fourth dimming module having a fourth liquid-crystal layer. The liquid-crystal molecules of the first liquid-crystal layer have a first alignment angle, the liquid-crystal molecules of the third liquid-crystal layer have a third alignment angle, and the first alignment angle is different from the third alignment angle.

18 Claims, 8 Drawing Sheets

ELECTRONIC DEVICE AND SHADING DEVICE

CROSS REFERENCE TO RELATED APPLICATIONS

This application claims priority of China Patent Application No. 202311065792.6, filed on Aug. 23, 2023, the entirety of which is incorporated by reference herein.

BACKGROUND OF THE INVENTION

Field of the Invention

The present disclosure relates to an electronic device and a shading device, and in particular to an electronic device including a dimming device and a shading device including the same.

Description of the Related Art

There are a wide variety of architectural structures including buildings, billboards, installation art, shelters, and others, which can accommodate humans, animals, plants, and various goods. These architectural structures may have shading devices for blocking outdoor light sources. In order to increase the utilization of these shading devices, they may have identification devices that provide identifiable names and identifiable logos.

Most of the identification devices currently used are display devices or printed billboards. However, the display devices require power to present designs or words, whereas printed billboards cannot be seen at night without the benefit of outdoor lighting. Moreover, during the daytime, the names and logos displayed on the display devices may be difficult to recognize due to strong ambient light.

BRIEF SUMMARY OF THE INVENTION

In order to conform to energy-saving policies and to reduce the possibility that names and logos on the shading devices are difficult to recognize for the aforementioned reasons, the present disclosure provides an electronic device that includes a dimming device and a shading device including the same.

According to some embodiments of the present disclosure, an electronic device including a first dimming device and a second dimming device adjacent to each other is provided. The first dimming device includes a first dimming module having a first liquid-crystal layer and a second dimming module having a second liquid-crystal layer and disposed opposite the first dimming module. The second dimming device includes a third dimming module having a third liquid-crystal layer and a fourth dimming module having a fourth liquid-crystal layer and disposed opposite the third dimming module. That is, in an embodiment, the first dimming module and the second dimming module are stacked along a normal direction (defined as the first direction D1) of each dimming module. The second dimming device is disposed adjacent to the first dimming device along a second direction perpendicular to the first direction (the normal direction of each dimming module). A liquid-crystal molecule of the first liquid-crystal layer has a first alignment angle, a liquid-crystal molecule of the third liquid-crystal layer has a third alignment angle, and the first alignment angle is different from the third alignment angle.

According to some embodiments of the present disclosure, a shading device capable of modulating light emitted from a light source is provided. The shading device comprises a first dimming device and a second dimming device adjacent to the first dimming device. The light source emits a first light beam and a second light beam. The first light beam forms a third light beam by using the first dimming device. The second light beam forms a fourth light beam by using the second dimming device. At the receiving angle or position outside the shading device, the light intensity of the third light beam is different from the light intensity of the fourth light beam. In some embodiments, the light intensity is observed with naked eye. For example, when observed with the naked eye, a brighter light indicates a stronger light intensity, and a darker light indicates a weaker light intensity, but the present disclosure is not limited thereto. In some embodiments, the light intensity may be measured by an instrument such as a gloss meter, a viewing angle analyzer, and the like.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
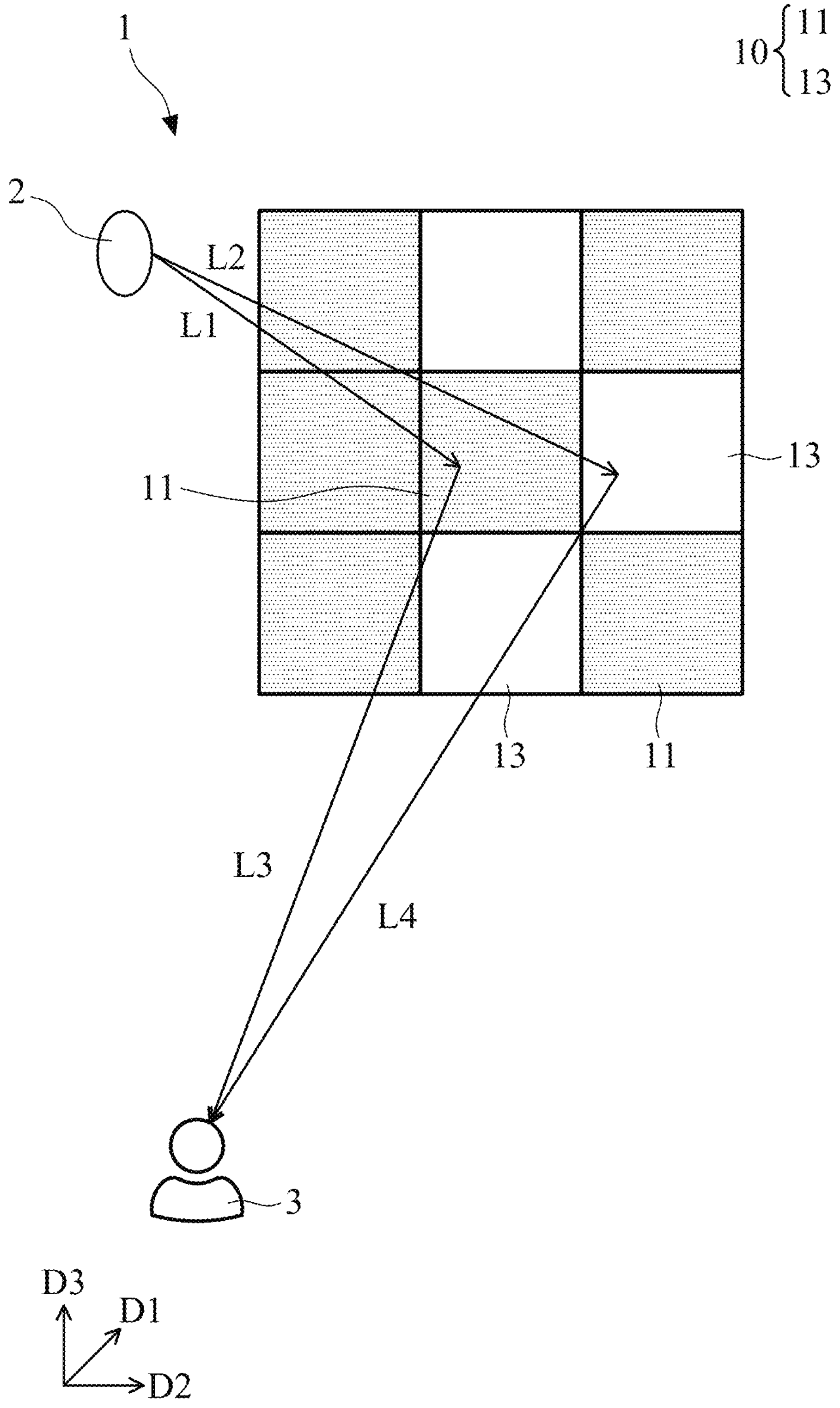
FIG. 1 is a schematic view of an effect of a shading device including an electronic device, according to an embodiment of the present disclosure.

The following is a detailed description of the electronic device of some embodiments of the present disclosure. It should be understood that, in the following description, various embodiments and examples are provided in order to implement the different aspects of some embodiments of the present disclosure. The specific elements and arrangements described in the following description are set forth in order to describe some embodiments of the present disclosure in a clear and easy manner. Of course, these are only used as examples but not as limitations of the present disclosure. In addition, repeated symbols or labels may be used in different embodiments. These repetitions are made only for the purpose of briefly and clearly describing some embodiments of the present disclosure and do not imply any correlation between the different embodiments and/or structures discussed.

In the disclosure, the terms "about," "approximate," or "substantially" usually indicates a value of a given value or range that varies within 10%, or within 5%, or within 3%, or within 2%, or within 1%, or within 0.5%. The value given here are approximate value, i.e., "about," "approximate," or "substantially" may be implied without specifying "about," "approximate," or "substantially". In the disclosure, the term "a-b" indicates a value which is greater than or equal to a and less than or equal to b.

It should be understood that, although the terms "first", "second", "third" etc. are used herein to describe various elements, components, area, layer, or parts, these elements, components, area, layer, or parts should not be limited by these terms. These terms are only used to distinguish one elements, components, area, layer, or parts from other elements, components, area, layer, or parts. Thus, a first element, component, area, layer, or part discussed below could be termed as a second element, component, area, layer, or part without departing from the teachings of the present disclosure.

It should be understood that relative terms such as "under", "on", "horizontal", "vertical", "below", "above", "top", "bottom", etc. shall be construed to indicate orientations shown in the paragraph and the related accompanying drawings. The relative terms are used for explanatory purposes only and does not imply that the device described is manufactured or operated in a specific orientation. It should be understood that if the device shown in the drawing is turned upside down, the components described at the "lower" side would become the components at the "upper" side. The embodiments of the present disclosure can be understood together with the accompanying drawings, which are also considered a part of the specification. It should be understood that the drawings of the present disclosure are not to scale and, in fact, the dimensions of the components may be arbitrarily exaggerated or reduced in order to clearly illustrate features of the present disclosure.

Unless defined otherwise, all terms (including technical and scientific terms) used herein have the same meaning as commonly understood by one of ordinary skills in the art to which this disclosure belongs. It should be understood that terms, such as those defined in commonly used dictionaries, should be interpreted as having a meaning that conforms to the relative skills of the present disclosure and the background or the context of the present disclosure, and should not be interpreted in an idealized or overly formal manner unless so defined.

The specification of the disclosure and the appended claims will use some terms to refer to particular elements. Those skilled in the art should understand that manufacturers of the electronic devices may refer to the same elements by different names. It is not intended herein to distinguish between the elements that perform the same function but have different names. In the following specification and claims, the terms "comprises" and "includes" are open-ended terms and should be interpreted to mean "comprises, but is not limited to . . . ".

The term "pretilt angle" in the disclosure refers to an angle between an optical axis of a liquid-crystal molecule and a plane on which a projection of the liquid-crystal molecule is located. A pretilt angle can be observed from cross-sectional schematic views of the disclosure. The term "alignment angle" in the disclosure refers to an angle between a projection of the liquid-crystal molecule on the surface (plane) where the liquid-crystal molecule is located and a x-axis of the plane (for example, a second direction D2, which is perpendicular to the normal direction of each dimming module). An alignment angle can be observed from top schematic views of the present disclosure.

The electronic device of the present disclosure may include a packaging device, a semiconductor display device, a backlight device, an antenna device, a sensing device, a splicing device, or a building material, but is not limited thereto. The electronic device may be a bendable or flexible electronic device. The display device may be a non-self-illuminating display device or a self-illuminating display device. The antenna device may be a liquid-crystal type antenna device or a non-liquid-crystal type antenna device. The sensing device may be a sensing device that senses capacitance, light, heat energy or ultrasonic waves, but is not limited thereto. The splicing device may be, for example, a display splicing device or an antenna splicing device, but is not limited thereto. Building materials may be used in shading devices. The shading device may be a transparent display, a window, an outdoor billboard, a projection screen, a building facade, or a decorative panel. The windows may be smart windows. It should be noted that the electronic device may be any combination of the foregoing, but is not limited thereto.

The electronic device of the present disclosure may be applied to a shading device. FIG. 1 is a schematic view of an effect of a shading device 1 including an electronic device 10, according to an embodiment of the present disclosure. As shown in FIG. 1, the electronic device 10 includes a first dimming device 11 and a second dimming device 13 adjacent to each other. A light source 2 emits a first light beam L1 and a second light beam L2. The first light beam L1 and the second light beam L2 form a third light beam L3 and a fourth light beam L4 by using the first dimming device 11 and the second dimming device 13 respectively. An observer 3 receives the third light beam L3 and the fourth light beam L4 from the first dimming device 11 and the second dimming device 13. In some embodiments, the light source 2 is located at the same side as the observer 3 with respect to the shading device 1, as shown in FIG. 1. The first light beam L1 may be reflected by the first dimming device 11 to form the third light beam L3, and the second light beam L2 may be reflected by the second dimming device 13 to form the fourth light beam L4, but the present disclosure is not limited thereto. In some embodiments, the shading device 1 is disposed between the light source 2 and the observer 3 and the light source 2 emits a first light beam L1 and a second light beam L2. The first light beam L1 may penetrate the first dimming device 11 to form the third light beam L3, and the second light beam L2 may penetrate the second dimming device 13 to form the fourth light beam L4. The normal direction of the first dimming device 11 and the second dimming device 13 is defined as a first direction D1. In some embodiments, the second dimming device 13 may be provided adjacent to the first dimming device 11 along a second direction D2 and/or a third direction D3 perpendicular to the second direction D2, but the present disclosure is not limited thereto. In some embodiments, the first direction D1 is perpendicular to the second direction D2.

In some embodiments, the light source 2 may include sunlight, any outdoor light, or any indoor light. In some embodiments, the first dimming device 11 and the second dimming device 13 may be disposed, for example, in a transparent display device, an outdoor billboard, a building facade, a decorative panel, a smart window, a projection screen, and the like, but are not limited thereto.

In some embodiments, the electronic device 10 may include a plurality of first dimming devices 11 and/or a plurality of second dimming devices 13, depending on design requirements. The number of first dimming devices 11 and the number of second dimming devices 13 in the electronic device 10 may be the same or different. In some embodiments, the first dimming devices 11 and the second dimming devices 13 may be arranged to present a desired pattern and/or word, depending on design requirements. For example, depending on design requirements, the electronic device 10 may include 6 first dimming devices 11 and 3 second dimming devices 13. In some embodiments, these first dimming devices 11 and second dimming devices 13 may be arranged to form a 3×3 matrix presenting a "K", as shown in FIG. 1.

Figure 2A:
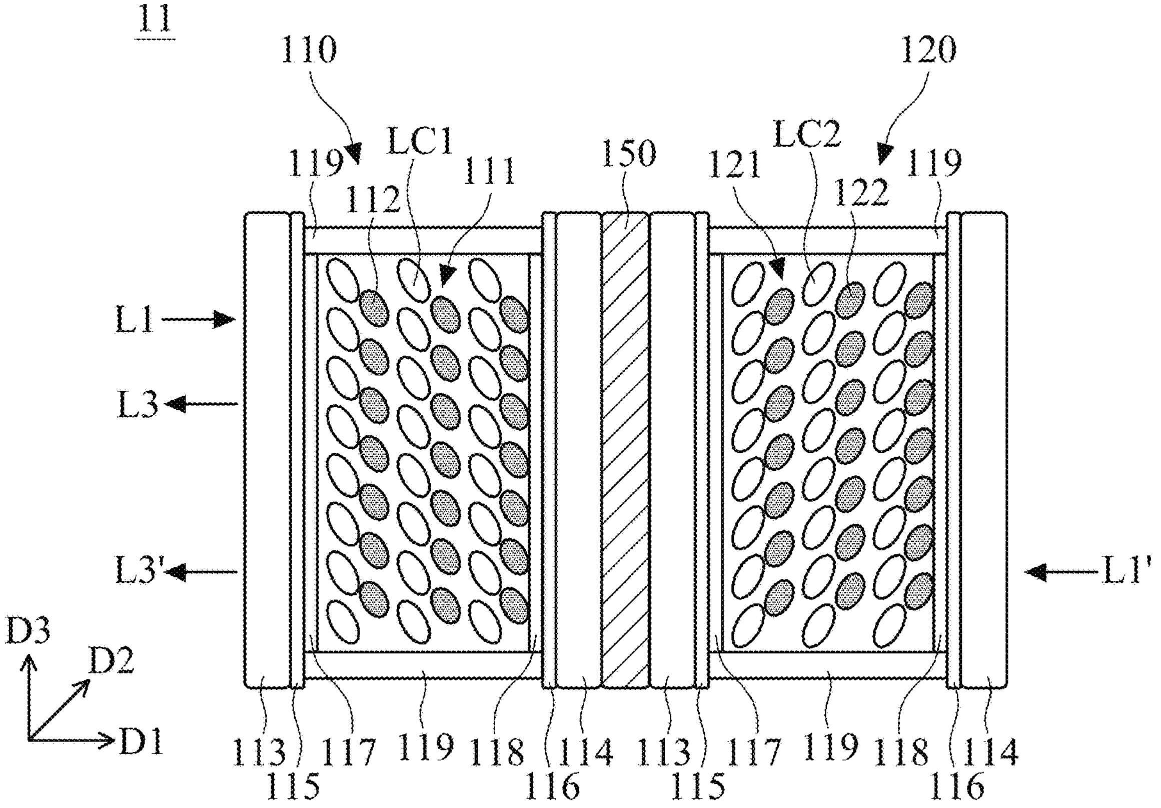
FIG. 2A is a cross-sectional schematic view of a first dimming device according to an embodiment of the present disclosure.
Figure 2B:
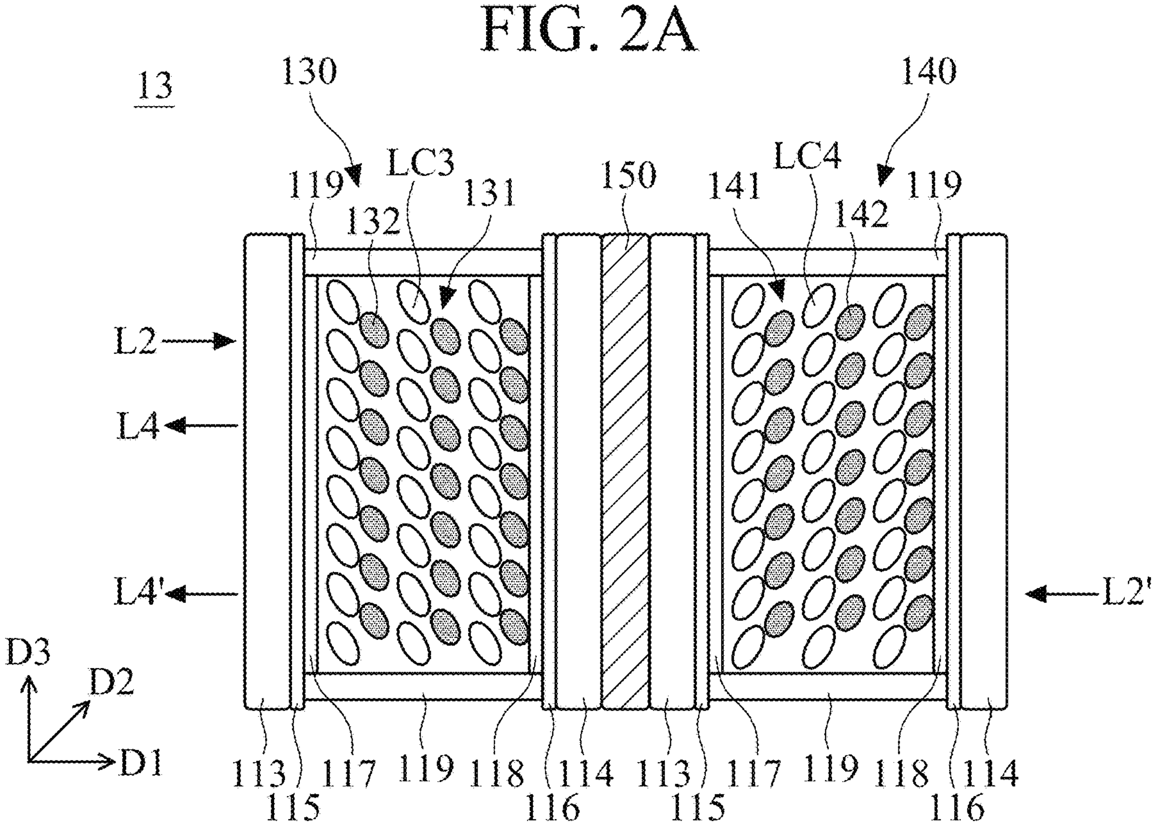
FIG. 2B is a cross-sectional schematic view of a second dimming device according to an embodiment of the present disclosure.

FIG. 2A is an enlarged cross-sectional schematic view of a first dimming device 11 according to an embodiment of the present disclosure. FIG. 2B is an enlarged cross-sectional schematic view of a second dimming device 13 according to an embodiment of the present disclosure.

As shown in FIG. 2A and FIG. 2B, the first dimming device 11 may include a first dimming module 110 and a second dimming module 120, and the second dimming device 13 may include a third dimming module 130 and a fourth dimming module 140. The first dimming module 110 includes a first liquid-crystal layer 111, the second dimming module 120 includes a second liquid-crystal layer 121, the third dimming module 130 includes a third liquid-crystal layer 131, and the fourth dimming module 140 includes a fourth liquid-crystal layer 141. The alignment angle of the liquid-crystal molecule of the first liquid-crystal layer 111 is different from the alignment angle of the liquid-crystal molecule of the third liquid-crystal layer 131. Therefore, without electricity, the first light beam L1 and the second light beam L2 (such as sunlight or any outdoor light) reflected by the first dimming device 11 and the second dimming device 13 can be form the third light beam L3 and the fourth light beam L4 having different intensities due to the difference between the alignment angle of the liquid-crystal molecule of the first liquid-crystal layer 111 and the alignment angle of the liquid-crystal molecule of the third liquid-crystal layer 131. Also, without electricity, the first light beam L1 and the second light beam L2 (such as indoor light) penetrating the first dimming device 11 and the second dimming device 13 can be form the third light beam L3 and the fourth light beam L4 having different intensities due to the difference between the alignment angle of the liquid-crystal molecule of the first liquid-crystal layer 111 and the alignment angle of the liquid-crystal molecule of the third liquid-crystal layer 131. The observer 3 at a receiving position or receiving angle outside (for example, in the first direction D1 which is substantially perpendicular to the second direction D2 and the third direction D3) of the shading device 1 can receive the third light beam L3 and the fourth light beam L4 having different intensities from the first dimming device 11 and the second dimming device 13. That is, without electricity, when the observer 3 observes the shading device 1 at the receiving position, the first dimming device 11 and the second dimming device 13 of the electronic device 10 may present relatively black and relatively white.

The structure of the first dimming device 11 and the second dimming device 13 of the present disclosure is further described below in conjunction with FIG. 2A and FIG. 2B.

As shown in FIG. 2A, the first dimming device 11 may include a first dimming module 110 and a second dimming module 120. The first dimming module 110 includes an upper substrate 113, a lower substrate 114, an upper conductive layer 115, a lower conductive layer 116, an upper alignment layer 117, a lower alignment layer 118, an adhesive 119, a first dye 112, and a first liquid-crystal layer 111.

The first liquid-crystal layer 111 is disposed between the upper substrate 113 and the lower substrate 114. The lower substrate 114 may include the same or a different material as the upper substrate 113. In some embodiments, the upper substrate 113 and/or the lower substrate 114 may include transparent or opaque organic or inorganic materials, and may also include rigid or flexible materials. Examples of the organic materials may include polyimide (PI), polycarbonate (PC), polyethylene terephthalate (PET), liquid-crystal polymer (LCP), other known suitable materials, or any combination of the foregoing, but the present disclosure is not limited thereto. Examples of the inorganic materials may include dielectric materials, metallic materials, other known suitable materials, or any combination of the foregoing, but the present disclosure is not limited thereto. Examples of the rigid materials may include glass, quartz, sapphire, ceramics, plastics, other known suitable materials, or any combination of the foregoing, but the present disclosure is not limited thereto. The term "flexible material" as used herein refers to a material that can be curved, bent, folded, rolled, flexed, stretched and/or other similarly deformed to indicate at least one of the above possible means of deformation. Example of the flexible material may include one of the organic materials mentioned above, but the flexible materials in the present disclosure are not limited to the materials mentioned above. Furthermore, term "flexible" is not limited to the ability to deform as mentioned above.

In some embodiments, the upper conductive layer 115 may be disposed on the upper substrate 113 and the lower conductive layer 116 may be disposed on the lower substrate 114. The upper conductive layer 115 and the lower conductive layer 116 are disposed between the upper substrate 113 and the lower substrate 114. The lower conductive layer 116 may include the same or a different material as the upper conductive layer 115. In some embodiments, the upper conductive layer 115 and/or the lower conductive layer 116 may include metallic materials (e.g., gold (Au), copper (Cu), tungsten (W), or nickel (Ni)), metal oxide conductive materials (e.g., indium tin oxide (ITO)), other suitable materials, or any combination of the foregoing. In some embodiments, a voltage may be applied to the first liquid-crystal layer 111 through the upper conductive layer 115 and the lower conductive layer 116 when desired.

In some embodiments, the upper alignment layer 117 may be further disposed on the upper substrate 113 and the lower alignment layer 118 may be further disposed on the lower substrate 114. In some embodiments, the upper alignment layer 117 and the lower alignment layer 118 may be disposed between the upper conductive layer 115 and the lower conductive layer 116, but the present disclosure is not limited thereto. In other embodiments, the upper conductive layer 115 and the lower conductive layer 116 may be omitted. The upper alignment layer 117 and the lower alignment layer 118 may be disposed between the upper substrate 113 and the lower substrate 114. The upper alignment layer 117 may include the same or different materials as the lower alignment layer 118. In some embodiments, the upper alignment layer 117 and/or the lower alignment layer 118 may include polyimides, polyamic acids (PAA), other suitable materials, or any combination of the foregoing.

In some embodiments, the adhesive 119 may be disposed between the upper conductive layer 115 and the lower conductive layer 116 and indirectly connect the upper substrate 113 and the lower substrate 114. The adhesive 119, the upper conductive layer 115 and the lower conductive layer 116 together form a cavity. The first liquid-crystal layer 111 is disposed in the cavity. In other embodiments, the upper conductive layer 115 and the lower conductive layer 116 may be omitted. The adhesive 119 may be disposed between the upper substrate 113 and the lower substrate 114 and directly connect the upper substrate 113 and the lower substrate 114. The adhesive 119, the upper substrate 113 and the lower substrate 114 together form a cavity and the first liquid-crystal layer 111 is disposed in the cavity. The adhesive 119 may be a framing adhesive, which may include, for example, acrylic resins, epoxy resins, polyurethanes, or any combination of the foregoing. In some embodiments, the acrylic resins may include free radical acrylic resins. In some embodiments, the adhesive 119 may include oligomers, monomers, light initiators, epoxy compounds, heat hardeners, other free radical initiators, other additives, other suitable materials, or a combination thereof.

In some embodiments, the first liquid-crystal layer 111 may be disposed between the upper alignment layer 117 and the lower alignment layer 118. The upper alignment layer 117 may be disposed between the upper conductive layer 115 and the first liquid-crystal layer 111, and the lower alignment layer 118 may be disposed between the lower conductive layer 116 and the first liquid-crystal layer 111. In other embodiments, the upper conductive layer 115 and the lower conductive layer 116 may be omitted. The first liquid-crystal layer 111 may be disposed between the upper alignment layer 117 and the lower alignment layer 118. The upper alignment layer 117 may be disposed between the upper substrate 113 and the first liquid-crystal layer 111, and the lower alignment layer 118 may be disposed between the lower substrate 114 and the first liquid-crystal layer 111.

The first liquid-crystal layer 111 may include a first liquid-crystal molecule LC1 and a first dye 112. The first dye 112 may include dark resins, azo compounds, anthraquinone compounds, other suitable materials, or any combination of the foregoing. The first liquid-crystal molecule LC1 may have a first pretilt angle and a first alignment angle. In some embodiments, the first pretilt angle is from about +2 degrees to about +10 degrees. In some embodiments, the first alignment angle is from about −20 degrees to about +20 degrees or from about +160 degrees to about +200 degrees. In other embodiments, the first alignment angle is from about +25 degrees to about +65 degrees. Light beam passing through the first liquid-crystal layer 111 may have different light intensities at different viewing angles, resulting in viewing angle asymmetry.

The second dimming module 120 is disposed opposite (adjacent in the first direction D1) to the first dimming module 110 and is connected to the first dimming module 110 by an adhesive layer 150. The adhesive layer 150 may be, for example, polyvinyl butyral resins (PVB), ethylene vinyl acetate copolymers (EVA), or optical clear adhesives (OCA).

Except that the second dimming module 120 includes the second liquid-crystal layer 121 instead of the first liquid-crystal layer 111, the structure of the second dimming module 120 is substantially the same as the structure of the first dimming module 110, so only the second liquid-crystal layer 121 is further described herein.

The second liquid-crystal layer 121 may include a second liquid-crystal molecule LC2 and a second dye 122. The second dye 122 may include dark resins, azo compounds, anthraquinone compounds, other suitable materials, or any combination of the foregoing. In some embodiments, the second dye 122 may be the same as or different from the first dye 112. The second liquid-crystal molecule LC2 has a second pretilt angle and a second alignment angle. The first alignment angle is substantially perpendicular to the second alignment angle. The term "substantially perpendicular" herein indicates that an angle between the two alignment angles is between 80 degrees and 100 degrees. In some embodiments, the angle between the first alignment angle and the second alignment angle is between about 80 degrees and about 100 degrees. In some embodiments, the second pretilt angle is between about +2 and about +10 degrees. In some embodiments, the second alignment angle is from about +70 degrees to about +110 degrees or from about +250 degrees to about +290 degrees. In other embodiments, the second alignment angle is about +115 degrees to about +155 degrees. With the second pretilt angle of about +2 to about +10 degrees, the light beam passing through the second liquid-crystal layer 121 may have different light intensities at different viewing angles, resulting in viewing angle asymmetry.

As shown in FIG. 2(*b*), the second dimming device 13 may include a third dimming module 130, a fourth dimming module 140, and an adhesive layer 150. The third dimming module 130 is disposed opposite (i.e., adjacent in the first direction D1) to the fourth dimming module 140. The adhesive layer 150 is disposed between the third dimming module 130 and the fourth dimming module 140 to bond the third dimming module 130 and the fourth dimming module 140. Except that the third dimming module 130 comprises a third liquid-crystal layer 131 instead of a first liquid-crystal layer 111 and the fourth dimming module 140 comprises a fourth liquid-crystal layer 141 instead of a second liquid-crystal layer 121, the structure of the second dimming device 13 is the same as that of the first dimming device 11. Therefore, only the third liquid-crystal layer 131 and the fourth liquid-crystal layer 141 are further described herein.

The third liquid-crystal layer 131 may include a third liquid-crystal molecule LC3 and a third dye 132. The third dye 132 may include dark resins, azo compounds, anthraquinone compounds, other suitable materials, or any combination of the foregoing. In some embodiments, the third dye 132 may be the same as or different from the first dye 112 and/or the second dye 122. The third liquid-crystal molecule LC3 has a third pretilt angle and a third alignment angle. In some embodiments, the third pretilt angle is from about +2 degrees to about +10 degrees. The first alignment angle is different from the third alignment angle. In some embodiments, the third alignment angle is from about +20 degrees to about +160 degrees or from about +200 degrees to about +340 degrees. In some embodiments, the third alignment angle is about +205 degrees to about +245 degrees. With the third pretilt angle of about +2 to about +10 degrees, the light beam passing through the third liquid-crystal layer 131 may have different light intensities at different viewing angles, resulting in viewing angle asymmetry.

The fourth liquid-crystal layer 141 may include a fourth liquid-crystal molecule LC4 and a fourth dye 142. The fourth dye 142 may include dark resins, azo compounds, anthraquinone compounds, other suitable materials, or any combination of the foregoing. In some embodiments, the fourth dye 142 may be the same as or different from the first dye 112, the second dye 122, and/or the third dye 132. The fourth liquid-crystal molecule LC4 has a fourth pretilt angle and a fourth alignment angle. The third alignment angle is substantially perpendicular to the fourth alignment angle. The term "substantially perpendicular" herein indicates that an angle between the two alignment angles is between 80 degrees and 100 degrees. In some embodiments, the angle between the third alignment angle and the fourth alignment angle is between about 80 degrees and about 100 degrees. In some embodiments, the fourth pretilt angle is between about +2 degrees and about +10 degrees. In some embodiments, the fourth alignment angle is about +110 degrees to about +250 degrees or about-70 degrees to about +70 degrees. In some embodiments, the fourth alignment angle is about +295 degrees to about +335 degrees. With a fourth pretilt angle of about +2 to about +10 degrees, the light beam passing through the fourth liquid-crystal layer 141 may have different light intensities at different viewing angles, resulting in viewing angle asymmetry.

In the embodiment that the first alignment angle is from about-20 degrees to about +20 degrees or from about +160 degrees to about +200 degrees and the third alignment angle is from about +20 degrees to about +160 degrees or from about +200 degrees to about +340 degrees. When the first light beam L1 is irradiated from the first dimming module 110 of the first dimming device 11 towards the second dimming module 120, the first light beam L1 is reflected to form the third light beam L3. When the second light beam L2 is irradiated from the third dimming module 130 of the second dimming device 13 towards the fourth dimming module 140, the second light beam L2 is reflected to form the fourth light beam L4. At the same viewing angle and/or the same receiving position, the first light beam L1 and the second light beam L2 have the same light intensity, and the third light beam L3 and the fourth light beam L4 have different light intensity. In some embodiments, the first light beam L1 and the second light beam L2 may be lights having the same characteristics from the same light source. In some embodiments, the light source may be sun or any outdoor light. In embodiments that the light source is sun, the first light beam L1 and the second light beam L2 may be sunlight. In some embodiments, the third light beam L3 will have different light intensities at different viewing angles. In some embodiments, the fourth light beam L4 will have different light intensities at different viewing angles.

Figure 3:
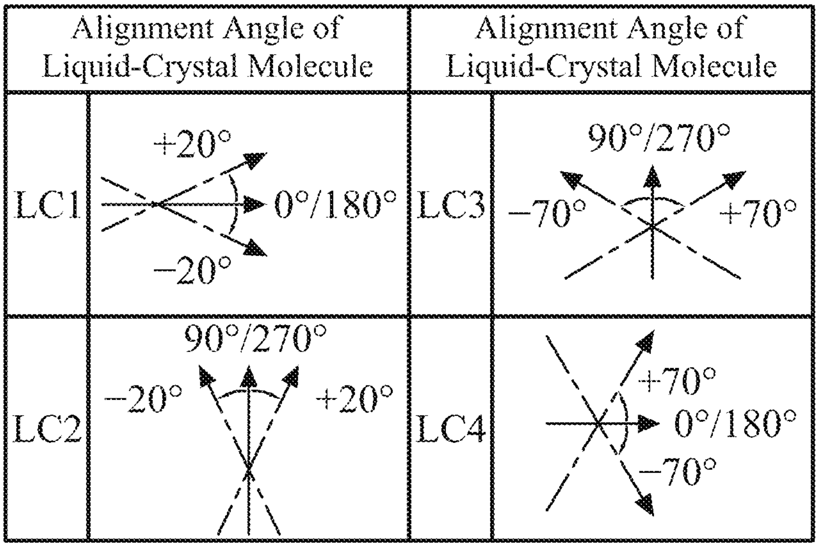
FIG. 3 is a top schematic view illustrating alignment angles of liquid-crystal molecules in the first liquid-crystal layer to the fourth liquid-crystal layer according to an embodiment of the present disclosure.
Figure 4:
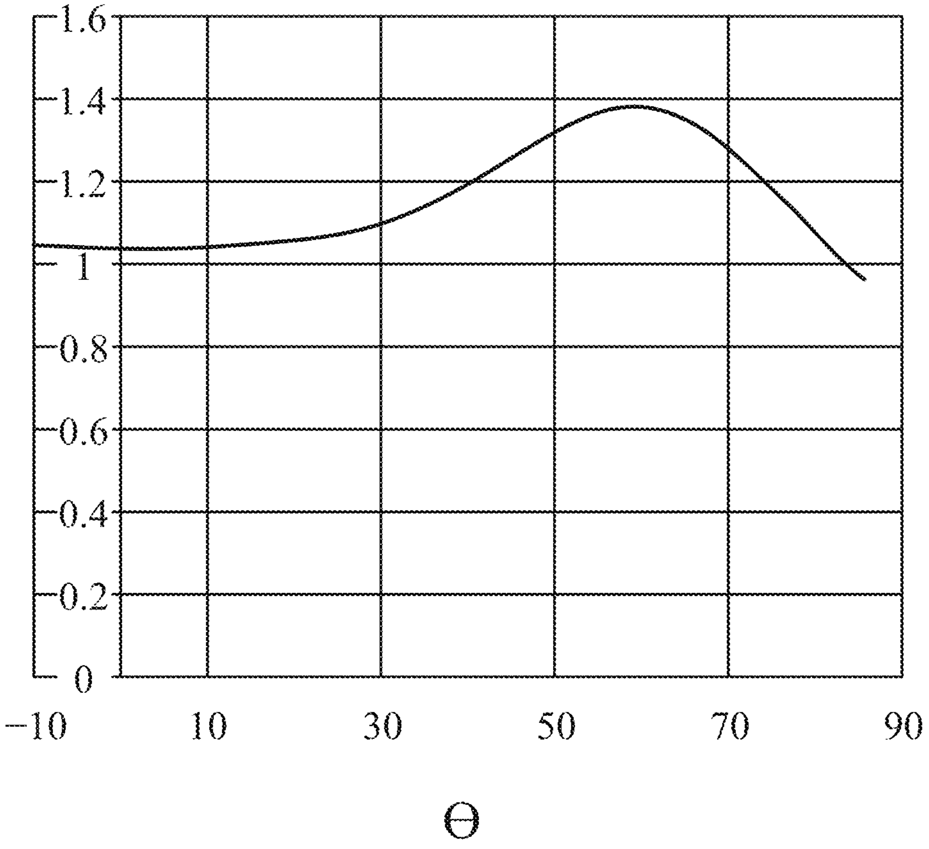
FIG. 4 is a graph illustrating a comparison of the reflected light intensity of the light modulated by using the first dimming device and the second dimming device shown in FIG. 3 at different viewing angles.

FIG. 3 is a top view schematic view illustrating the alignment angles of the first liquid-crystal molecule LC1 to the fourth liquid-crystal molecule LC4 in the first dimming module 110 and the second dimming module 120 of the first dimming device 11 and the third dimming module 130 and the fourth dimming module 140 of the second dimming device 13 according to an embodiment of the present disclosure. FIG. 4 is a graph illustrating a comparison of the light intensity of the third light beam L3 and the fourth light beam L4 formed by reflections from the first dimming module 110 to the fourth dimming module 140 in the electronic device 10 shown in FIG. 3 at different viewing angles. The effects of the electronic device 10 of the present disclosure are further described below with reference to FIG. 3 and FIG. 4.

In FIG. 3, solid lines indicate specific alignment angles of the first liquid-crystal molecule LC1 to the fourth liquid-crystal molecule LC4, dashed lines indicate the possible ranges of the alignment angles, and arrows indicate a pretilt angle direction of the first liquid-crystal molecule LC1 to the fourth liquid-crystal molecule LC4. Specifically, as shown in FIG. 3, the pretilt angles of the first liquid-crystal molecule LC1 to the fourth liquid-crystal molecule LC4 are all from about +2 degrees to about +10 degrees. Taking a projection of the pretilt angle direction on a top view plane as 0 degrees of alignment angle, the specific alignment angle of the first liquid-crystal molecule LC1 in the first dimming module 110 may be about 0 degrees or about +180 degrees, but the present disclosure is not limited thereto. The first liquid-crystal molecule LC1 in the first dimming module 110 in the present disclosure may have a possible range of about 0±20 degrees (about-20 degrees to about +20 degrees) or about +180±20 degrees (about +160 degrees to about +200 degrees), as shown in FIG. 3. In summary, as shown in FIG. 3, the specific alignment angle of the second liquid-crystal molecule LC2 in the second dimming module 120 may be about +90 degrees or about +270 degrees; the specific alignment angle of the third liquid-crystal molecule LC3 in the third dimming module 130 may be about +90 degrees or about +270 degrees; and the specific alignment angle of the fourth liquid-crystal molecule LC4 in the fourth dimming module 140 may be about 0 degrees or about +180 degrees. The specific alignment angle of the second liquid-crystal molecule LC2 in the second dimming module 120 in the present disclosure may range from about +90±20 degrees (about +70 degrees to about +110 degrees) or about +270±20 degrees (about +250 degrees to about +290 degrees); and the specific alignment angle of the third liquid-crystal molecule LC3 in the third dimming module 130 may range from about +90±70 degrees (about +20 degrees to about +160 degrees) or about +270±70 degrees (about +200 degrees to about +340 degrees); and the specific alignment angle of the fourth liquid-crystal molecule LC4 in the fourth dimming module 140 has a possible range of about 180±70 degrees (about +110 degrees to about +250 degrees) or about 0±70 degrees (about −70 degrees to about +70 degrees).

FIG. 4 is a graph illustrating a comparison of the reflected light intensity of the third light beam L3 and the fourth light beam L4 formed by the reflection from the first liquid-crystal molecule LC1 to the fourth liquid-crystal molecule LC4 at different viewing angles when the first liquid-crystal molecule LC1 to the fourth liquid-crystal molecule LC4 have the specific alignment angles shown in FIG. 3 (i.e., an alignment angle indicated by a solid line in FIG. 3). FIG. 4 is a graph obtained by measuring the light intensity of the third light beam L3 and the fourth light beam L4 reflected from the electronic device 10 at different viewing angles with a gloss meter, using the viewing angle as the horizontal axis and the value of the light intensity of the fourth light beam L4/the light intensity of the third light beam L3 as the vertical axis. The term "viewing angle" herein refers to an angle between a line connecting a center of a reception position and a center of the electronic device 10 and a ground plane when the observer 3 observes the shading device 1 in the reception position. As can be seen from FIG. 4, at a viewing angle of about +50 degrees to about +70 degrees, the contrast in light intensity between the third light beam L3 and the fourth light beam L4 formed by reflection from the electronic device 10 is most pronounced. That is, at a viewing angle of about +50 degrees to about +70 degrees, the black-and-white contrast between the first dimming device 11 and the second dimming device 13 of the electronic device 10 observed by the observer 3 in the receiving position is most pronounced.

In the embodiment that the first alignment angle is from +25 degrees to +65 degrees and the third alignment angle is from +205 degrees to +245 degrees. When the first light beam L1' is irradiated from the second dimming module 120 of the first dimming device 11 towards the first dimming module 110, the first light beam L1' will penetrate the first dimming device 11 to form the third light beam L3'. When the second light beam L2' is irradiated from the fourth dimming module 140 of the second dimming device 13 towards the third dimming module 130, the second light beam L2' will penetrate the second dimming device 13 to form the fourth light beam L4', as shown in FIG. 2. At the same viewing angle and/or the same receiving position, the first light beam L1' and the second light beam L2' have the same light intensity, and the third light beam L3' and the fourth light beam L4' have different light intensities. In some embodiments, the first light beam L1' and the second light beam L2' may be lights having the same characteristics from the same light source. In some embodiments, the light source may be any indoor light source. In some embodiments, the third light beam L3' will have different light intensities at different viewing angles. In some embodiments, the fourth light beam L4' will have different light intensities at different viewing angles.

Figure 5:
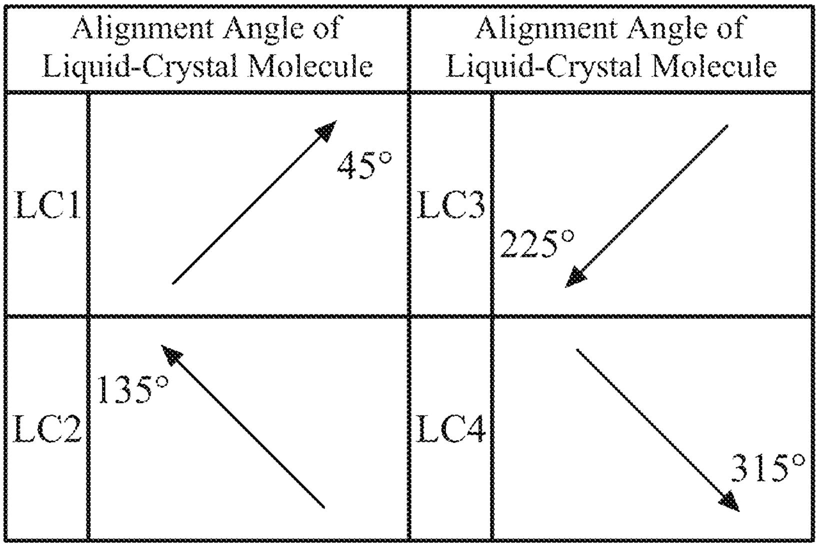
FIG. 5 is a top schematic view illustrating alignment angles of liquid-crystal molecules in the first dimming module to the fourth dimming module according to another embodiment of the present disclosure.

FIG. 5 is a top schematic view illustrating alignment angles of the first liquid-crystal molecule LC1 to the fourth liquid-crystal molecule LC4 in the first dimming module 110 to the fourth dimming module 140 according to another embodiment of the present disclosure. In FIG. 5, solid lines indicate specific alignment angles of the first liquid-crystal molecule LC1 to the fourth liquid-crystal molecule LC4, and arrows indicate a pretilt angle direction of the first liquid-crystal molecule LC1 to the fourth liquid-crystal molecule LC4. Specifically, as shown in FIG. 5, the pretilt angles of the first liquid-crystal molecule LC1 to the fourth liquid-crystal molecule LC4 are from about +2 degrees to about +10 degrees. Taking a projection of the pretilt angle direction on a top view plane as 0 degrees of alignment angle, the specific alignment angle of the first liquid-crystal molecule LC1 in the first dimming module 110 may be about +45 degrees; the specific alignment angle of the second liquid-crystal molecule LC2 in the second dimming module 120 may be about +135 degrees; the specific alignment angle of the third liquid-crystal molecule LC3 in the third dimming module 130 may be about +225 degrees; and the specific alignment angle of the fourth liquid-crystal molecule LC4 in the fourth dimming module 140 may be about +315 degrees, but the present disclosure is not limited thereto. The alignment angle of the first liquid-crystal molecule LC1 in the first dimming module 110 in the present disclosure may range from about +45±20 degrees (about +25 degrees to about +65 degrees); the alignment angle of the second liquid-crystal molecule LC2 in the second dimming module 120 may range from about +135±20 degrees (about +115 degrees to about +155 degrees); the alignment angle of the third liquid-crystal molecule LC3 in the third dimming module 130 may range from about +225±20 degrees (about +205 degrees to about +245 degrees); and the alignment angle of the fourth liquid-crystal molecule LC4 in the fourth dimming module 140 may range from about +315±20 degrees (about +295 degrees to about +335 degrees).

Figure 6A:
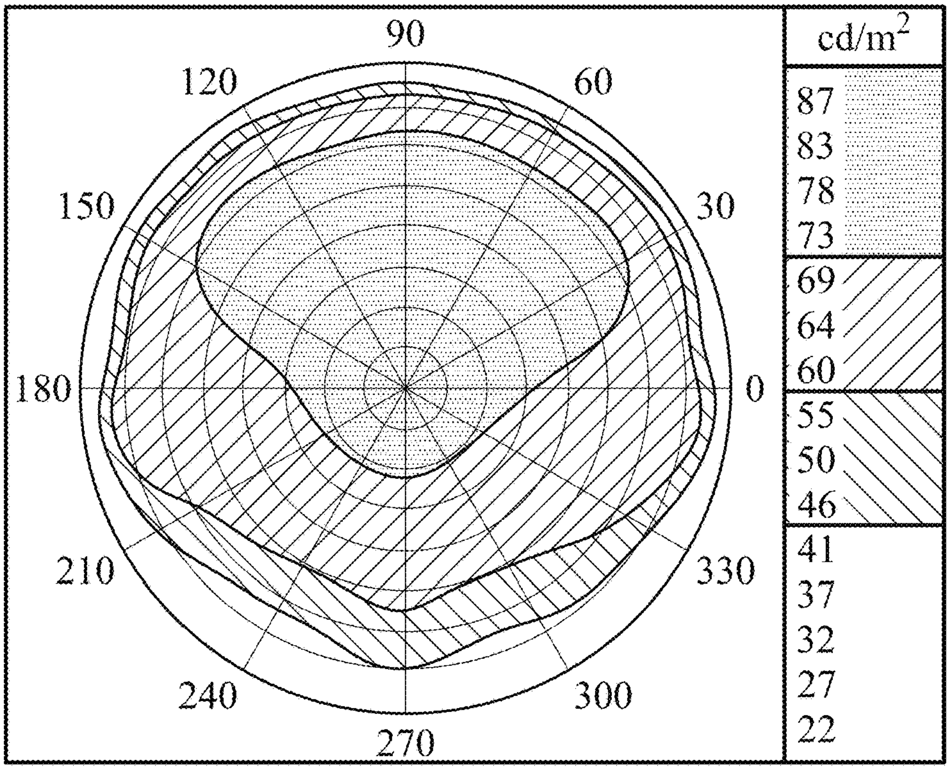
FIGS. 6A and 6B are diagrams of light patterns of the light modulated by using the first dimming device and the second dimming device shown in FIG. 5.
Figure 6B:
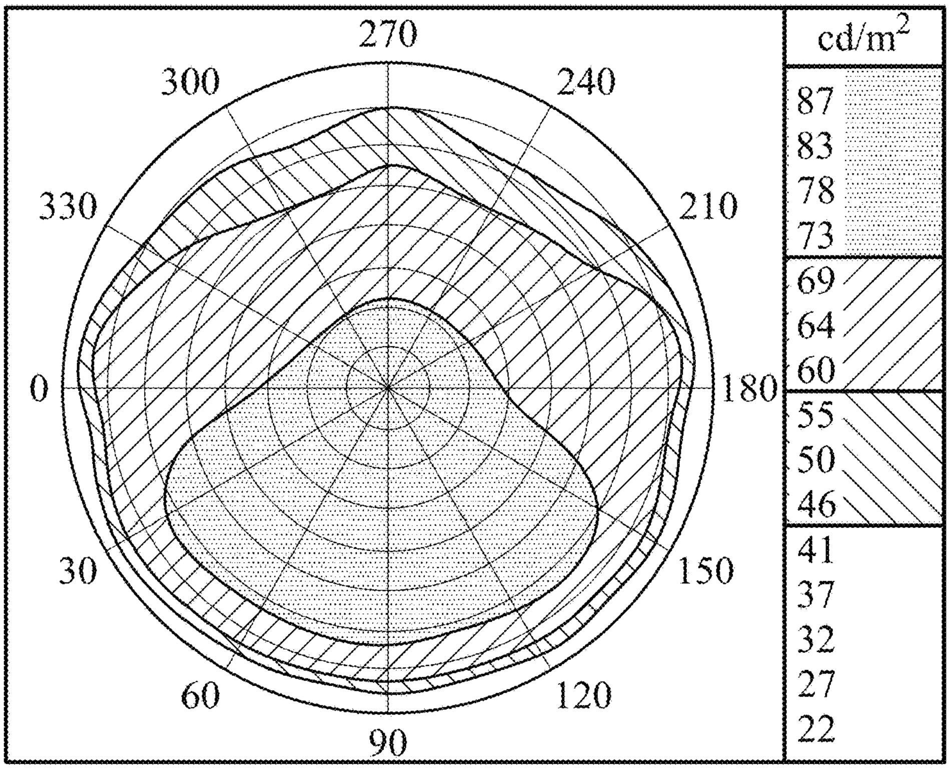
Figure 7:
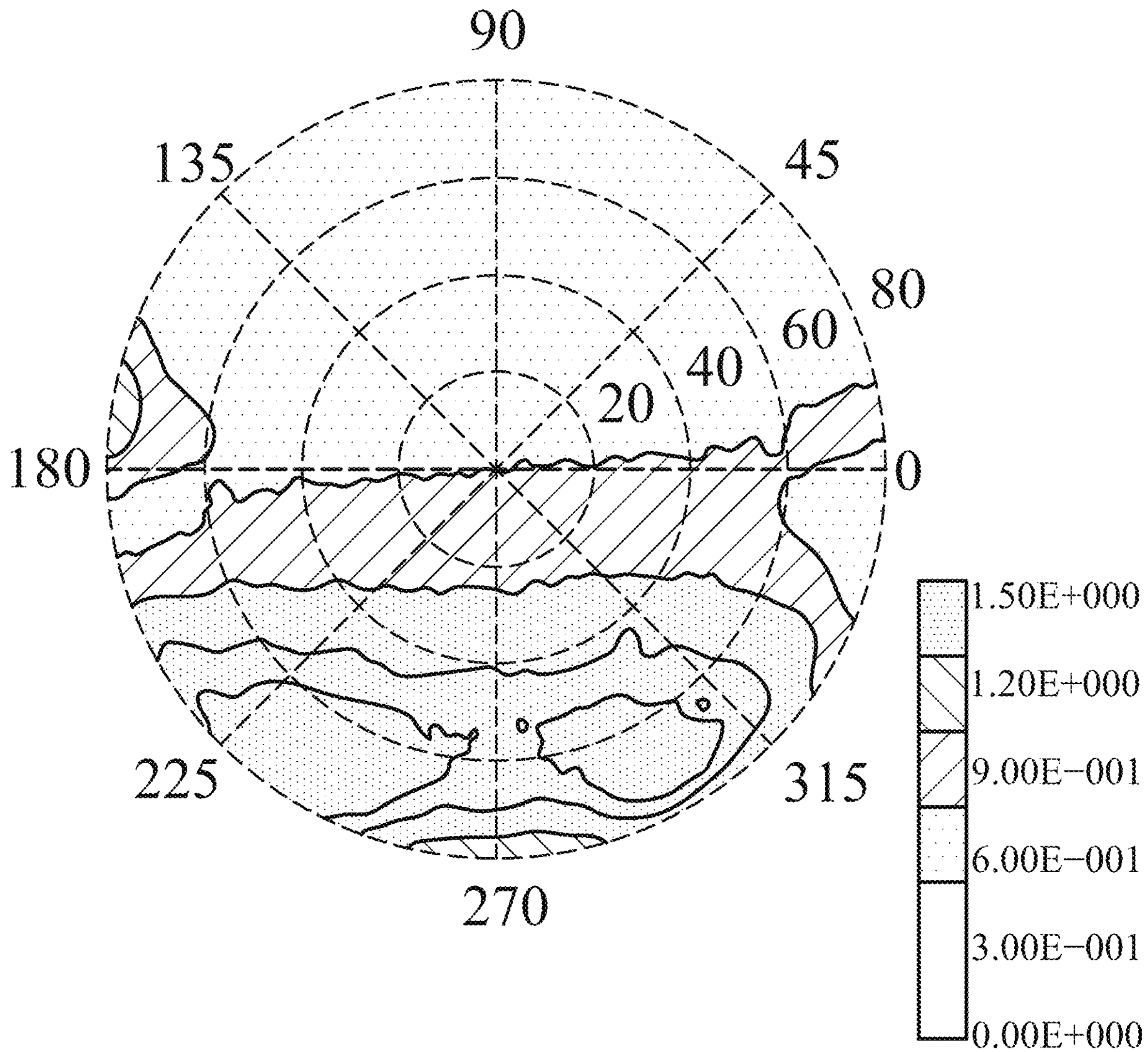
FIG. 7 is a diagram illustrating a comparison of the penetrating light intensity of the light modulated by using the first dimming device and the second dimming device shown in FIG. 5.

FIGS. 6A and 6B are diagrams illustrating light patterns of the third light beam L3' and the fourth light beam L4' when the first liquid-crystal molecule LC1 to the fourth liquid-crystal molecule LC4 have the specific alignment angles shown in FIG. 5. The third light beam L3' and the fourth light beam L4' are formed from the first light beam L1' and the second light beam L2' irradiating from the second dimming module 120 and the fourth dimming module 140 towards the first dimming module 110 and the third dimming module 130 and penetrating the electronic device 10. Specifically, FIG. 6A is a diagram illustrating a light pattern of the third light beam L3' formed by irradiating the first light beam L1' from the second dimming module 120 towards the first dimming module 110 and penetrating the first dimming device 11. FIG. 6B is a diagram illustrating a light pattern of the fourth light beam L4' formed by irradiating the second light beam L2' from the fourth dimming module 140 towards the third dimming module 130 and penetrating the second dimming device 13. FIG. 7 is a graph illustrating a comparison of penetrating light intensities of the third light beam L3' and the fourth light beam L4' observed by an observer from a position when the first liquid-crystal molecule LC1 to the fourth liquid-crystal molecule LC4 have the specific alignment angles shown in FIG. 5. That is, FIG. 7 is the result obtained by dividing FIG. 6B with FIG. 6A.

FIG. 6A and FIG. 6B are diagrams illustrating light patterns of the third light beam L3' and the fourth light beam L4' formed by penetrating the electronic device 10 measured by a viewable angle analyzer (Cono or WP conometer). FIG. 7 is a graph illustrating a comparison of penetrating light intensities of the third light beam L3' and the fourth light beam L4' formed by penetrating the electronic device 10 measured by a viewable angle analyzer (Cono or WP conometer).

As can be seen from FIGS. 6A, 6B, and 7, the contrast in light intensity between the third light beam L3' and the fourth light beam L4' formed by penetrating the electronic device 10 is most pronounced at a viewing angle of about +40 degrees to about +70 degrees. That is, at a viewing angle of about +40 degrees to about +70 degrees, the black-and-white contrast between the first dimming device 11 and the second dimming device 13 of the electronic device 10 observed by the observer 3 in the receiving position is most pronounced.

In summary, the electronic device provided according to some embodiments of the present disclosure may provide a distinct black and white contrast without electricity. The shading device of the present disclosure may be arranged to present a desired pattern and/or word according to design requirements without electricity.

In some embodiments, the first dimming device 11 may further include an isolation structure 20 and a protection structure 30. Similarly, the second dimming device 13 may further include an isolation structure 20 and a protection structure 30. The first dimming device 11 including the isolation structure 20 and the protection structure 30 is described below with reference to FIG. 8.

Figure 8:
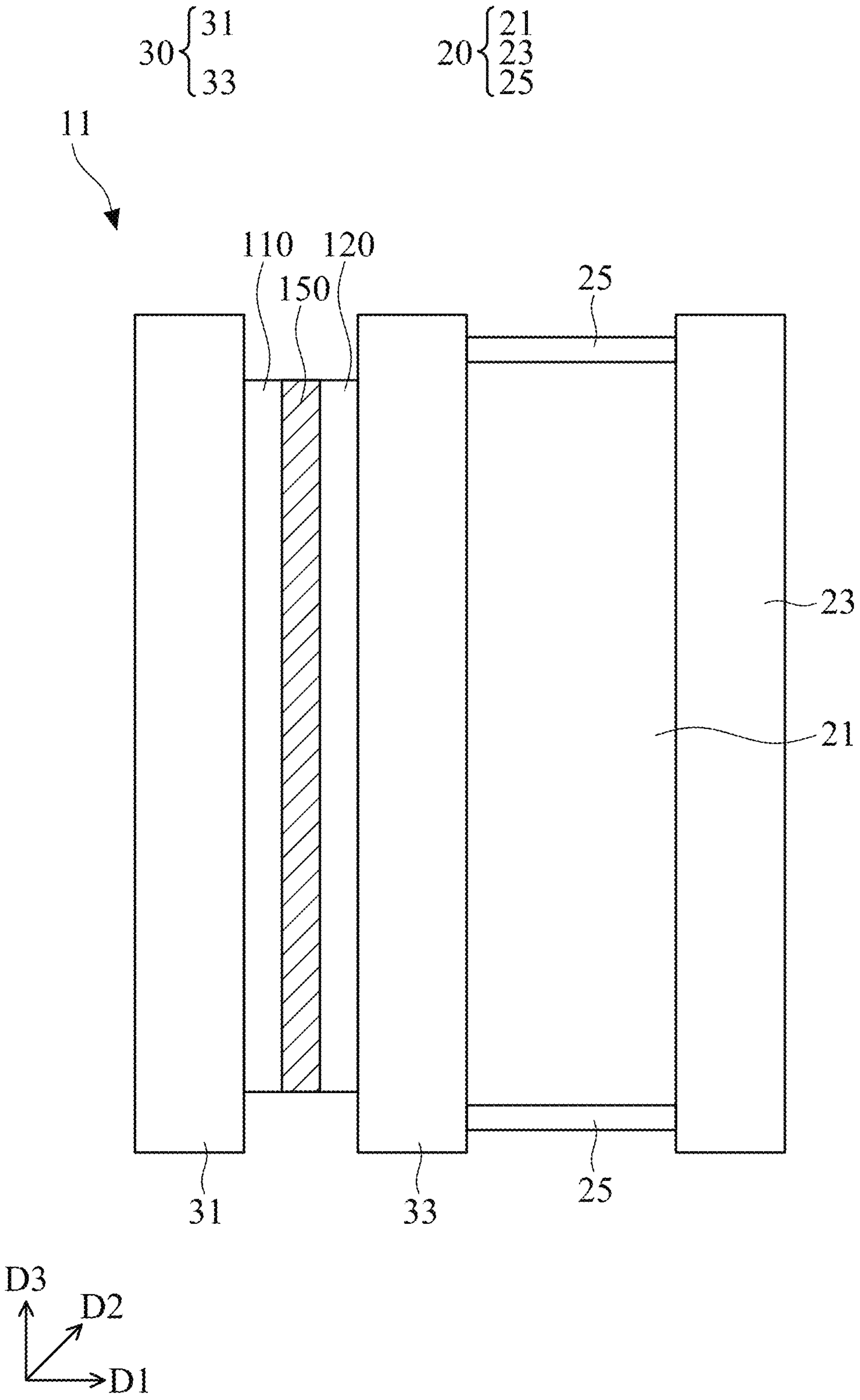
FIG. 8 is a cross-sectional schematic view of a first dimming device according to another embodiment of the present disclosure.

FIG. 8 is a cross-sectional schematic view of a first dimming device 11 according to another embodiment of the present disclosure. A normal direction of the first dimming device 11 is defined as a first direction D1. As shown in FIG. 8, the first dimming device 11 includes a first dimming module 110 and a second dimming module 120 stacked along the first direction D1, an adhesive layer 150 disposed between the first dimming module 110 and the second dimming module 120 and connecting the first dimming module 110 and the second dimming module 120, an isolation structure 20, and a protection structure 30 protecting the first dimming device 11. In some embodiments, the isolation structure 20 or the protection structure 30 may be omitted.

The protection structure 30 may include a first protection substrate 31 and a second protection substrate 33 opposite to the first protection substrate 31. The first dimming module 110 and the second dimming module 120 are disposed between the first protection substrate 31 and the second protection substrate 33. In some embodiments, the first protection substrate 31 and the second protection substrate 33 may include a transparent substrate having high hardness and high strength characteristics, such as a reinforced glass substrate, for example, to protect the first dimming module 110 and the second dimming module 120 disposed therebetween, but the present disclosure is not limited thereto. By providing the protection structure 30, the risk of the first dimming module 110 and the second dimming module 120 being scratched or damaged can be reduced.

In some embodiments, in the first direction D1, the second dimming module 120 is disposed between the second protection substrate 33 and the first dimming module 110, and the first dimming module 110 is disposed between the first protection substrate 31 and the second dimming module 120. In other embodiments, one of the first protection substrate 31 and the second protection substrate 33 may be omitted. In some embodiments, the second protection substrate 33 may be omitted, and in the first direction D1, the second dimming module 120 may be disposed between the isolation structure 20 and the first dimming module 110.

The isolation structure 20 may be disposed opposite the first dimming device 110. The isolation structure 20 may include any structure having an ability to isolate heat and/or solar radiation. In some embodiments, the isolation structure 20 may include an isolation medium 21, an isolation substrate 23, and an isolation connector 25, but the present disclosure is not limited thereto. In some embodiments, the isolation substrate 23 may include a Low-E glass substrate, a soda-lime glass substrate, a reinforced glass substrate, or any combination of the foregoing, but the present disclosure is not limited thereto. In some embodiments, the isolation connector 25 may include a frame structure having snap-together components. In some embodiments, the isolation connector 25 may include a metallic material, such as aluminum, magnesium, iron, or an alloy thereof, but the present disclosure is not limited thereto. In some embodiments, the isolation medium 21 may include a gas, such as air, argon, oxygen, or any combination of the foregoing, but the present disclosure is not limited thereto.

In some embodiments, the isolation connector 25 may be disposed on the isolation substrate 23 and between the isolation substrate 23 and the second protection substrate 33. In some embodiments, the isolation connector 25 may be connected to the isolation substrate 23 and the second protection substrate 33 by a snap-fit structure or/and adhesive, as shown in FIG. 8. The isolation connector 25, the isolation substrate 23, and the second protection substrate 33 together form a cavity. The isolation medium 21 is disposed between the isolation substrate 23 and the second protection substrate 33, and fills the cavity. In other embodiments, the second protection substrate 33 may be omitted and the isolation connector 25 may be disposed on the isolation substrate 23 and between the isolation substrate 23 and the second dimming module 120. In some embodiments, the isolation connector 25 may be connected to the isolation substrate 23 and the second dimming module 120 by a snap-fit structure or/and adhesive. The isolation connector 25, the isolation substrate 23, and the second dimming module 120 together form a cavity. The isolation medium 21 is disposed between the isolation substrate 23 and the second dimming module 120 and fills the cavity.

By means of the structures described above, the electronic device provided according to some embodiments of the present disclosure may provide significant black and white contrast, durability, and/or thermal and/or solar radiation isolation without electricity. The shading device of the present disclosure can be arranged to present desired patterns and/or word according to design requirements without electricity and have a long service life.

Although embodiments of the present disclosure and advantages thereof have been described above, it should be understood that various changes, substitutions and alterations can be made by those of ordinary skill in the art without departing from the spirit and scope of the disclosure. In addition, the scope of the claims of the present disclosure is not limited to the process, machine, manufacturing, material composition, device, method and steps described in the specific embodiments set forth in the specification, the presently existing or later to be developed process, machine, manufacturing, material composition, device, method and steps which may be readily appreciated from the present disclosure by one of ordinary skill in the art may be utilized according to the present disclosure, as long as what is substantially the same function can be performed or substantially the same result can be achieved in the embodiments described herein. Accordingly, the scope of the claims of the present disclosure includes the process, machine, manufacturing, material composition, device, method and steps mentioned above. In addition, it can be understood that, with the various implementations listed above, the present disclosure includes various implements. Each claim may constitute an individual embodiment, and the scope of the claims of the present disclosure also includes the combinations of the claims and embodiments. The scope of the present disclosure is subject to the definition of the scope of the appended claims.

What is claimed is:

1. An electronic device, comprising:

a first dimming device, comprising:

a first dimming module having a first liquid-crystal layer comprising a first liquid-crystal molecule and a first dye; and a second dimming module disposed opposite the first dimming module and having a second liquid-crystal layer; and a second dimming device adjacent to the first dimming device, comprising:

a third dimming module having a third liquid-crystal layer; and a fourth dimming module disposed opposite the third dimming module and having a fourth liquid-crystal layer, wherein liquid-crystal molecules of the first liquid-crystal layer have a first alignment angle, liquid-crystal molecules of the third liquid-crystal layer have a third alignment angle, the first alignment angle is different from the third alignment angle, and the first dye comprises dark resins, azo compounds, anthraquinone compounds, or a combination thereof.

2. The electronic device as claimed in claim 1, wherein liquid-crystal molecules of the second liquid-crystal layer have a second alignment angle, and the first alignment angle is perpendicular to the second alignment angle.

3. The electronic device as claimed in claim 1, wherein liquid-crystal molecules of the fourth liquid-crystal layer have a fourth alignment angle, and the third alignment angle is perpendicular to the fourth alignment angle.

4. The electronic device as claimed in claim 1, wherein the first alignment angle is from 20 degrees to +20 degrees or from +160 degrees to +200 degrees.

5. The electronic device as claimed in claim 4, wherein the third alignment angle is from +20 degrees to +160 degrees or from +200 degrees to +340 degrees.

6. The electronic device as claimed in claim 5, wherein liquid-crystal molecules of the fourth liquid-crystal layer have a fourth alignment angle, and the fourth alignment angle is +110 degrees to +250 degrees or −70 degrees to +70 degrees.

7. The electronic device as claimed in claim 4, wherein liquid-crystal molecules of the second liquid-crystal layer have a second alignment angle, and the second alignment angle is +70 degrees to +110 degrees or from +250 degrees to +290 degrees.

8. The electronic device as claimed in claim 1, wherein the first alignment angle is from +25 degrees to +65 degrees.

9. The electronic device as claimed in claim 8 wherein the third alignment angle is from +205 degrees to +245 degrees.

10. The electronic device as claimed in claim 9, wherein liquid-crystal molecules of the fourth liquid-crystal layer have a fourth alignment angle, and the fourth alignment angle is about +295 degrees to about +335 degrees.

11. The electronic device as claimed in claim 8, wherein liquid-crystal molecules of the second liquid-crystal layer have a second alignment angle, and the second alignment angle is about +115 degrees to about +155 degrees.

12. The electronic device as claimed in claim 1, wherein liquid-crystal molecules of the first liquid-crystal layer, the second liquid-crystal layer, the third liquid-crystal layer, or the fourth liquid-crystal layer have a pretilt angle, and the pretilt angle is from +2 degrees to +10 degrees.

13. The electronic device as claimed in claim 1, wherein the first dimming device further comprises an isolation structure and a protection structure.

14. The electronic device as claimed in claim 1, wherein the first dimming device further comprises an adhesive layer disposed between the first dimming module and the second dimming module.

15. A shading device capable of modulating light emitted from a light source, comprising:

a first dimming device comprising:

a first dimming module having a first liquid-crystal layer comprising a first liquid-crystal molecule and a first dye; and a second dimming module disposed opposite the first dimming module and having a second liquid-crystal layer; and a second dimming device adjacent to the first dimming device, comprising:

a third dimming module having a third liquid-crystal layer; and a fourth dimming module disposed opposite the third dimming module and having a fourth liquid-crystal layer, wherein liquid-crystal molecules of the first liquid-crystal layer have a first alignment angle, liquid-crystal molecules of the third liquid-crystal layer have a third alignment angle, the first alignment angle is different from the third alignment angle, and the first dye comprises dark resins, azo compounds, anthraquinone compounds, or a combination thereof, wherein a first light beam forms a third light beam by using the first dimming device, a second light beam forms a fourth light beam by using the second dimming device, and at a receiving angle or a position outside the shading device, a light intensity of the third light beam is different from a light intensity of the fourth light beam.

16. The shading device as claimed in claim 15, wherein the first dimming device further comprises an isolation structure, and the isolation structure is disposed opposite to the first dimming device.

17. The shading device as claimed in claim 15, wherein liquid-crystal molecules of the second liquid-crystal layer have a second alignment angle, and the first alignment angle is perpendicular to the second alignment angle.

18. The shading device as claimed in claim 15, wherein liquid-crystal molecules of the fourth liquid-crystal layer have a fourth alignment angle, and the third alignment angle is perpendicular to the fourth alignment angle.

* * * * *